Patented Mar. 22, 1949

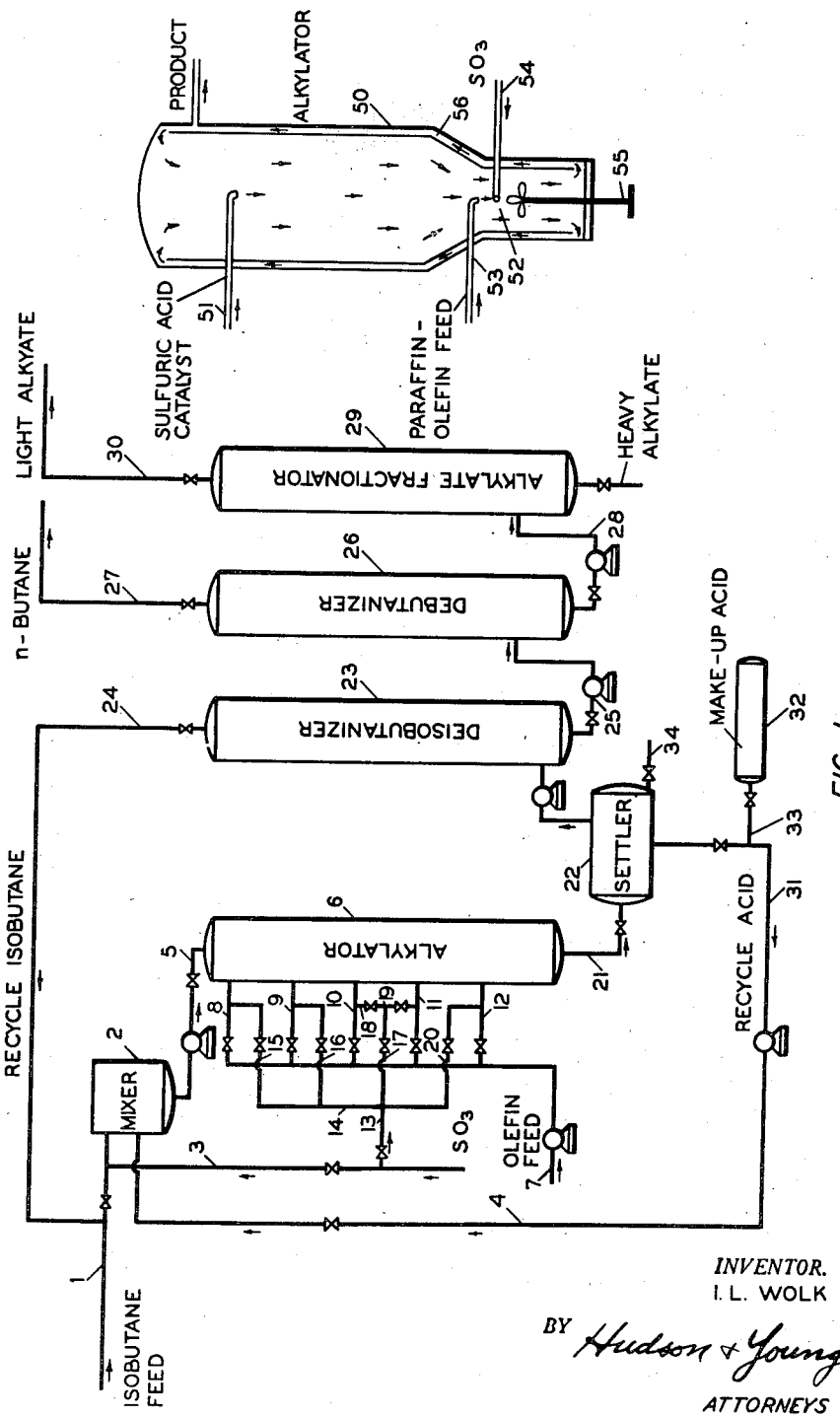

2,465,049

UNITED STATES PATENT OFFICE 2,465,049

ALKYLATION OF HYDROCARBONS

I. Louis Wolk, Bartlesville, Okla., assignor to Phillips Petroleum Company, a corporation of Delaware Application January 8, 1945, Serial No. 571,831

3 Claims. (Cl. 260—683.4)

This invention relates to the treatment of alkylatable hydrocarbons with alkylating reagents such as olefins to form alkylated products in the presence of sulfuric acid as a catalyst. More particularly it relates to the preparation of higher boiling isoparaffin hydrocarbons in the gasoline boiling range by the reaction or alkylation of lower boiling isoparaffins with olefins in the presence of sulfuric acid as a catalyst.

It is now common practice to alkylate isoparaffins with olefins to produce reaction products or alkylate boiling in the gasoline range, using sulfuric acid as a catalyst. The products obtained have high octane numbers and are ideally suited for blending into high octane fuels such as are required in modern aviation engines. Under the proper conditions, for example, isobutane will react with propylene, butylenes or pentenes to form saturated motor fuels in the presence of concentrated sulfuric acid as a catalyst, with minimum formation of olefin polymers and other undesired products. In a similar manner, aromatics, such as benzene, may be alkylated with ethylene, propylene, or other olefins.

The alkylation reaction may be carried out batchwise or continuously. In usual commercial practice, however sulfuric acid alkylation is carried out continuously, and the isoparaffin and olefin, either in the same feed stream or in separate streams are introduced through one or more inlets, along with fresh or recycled catalyst into an alkylation zone or chamber. In order to obtain sufficient agitation as well as to maintain proper ratios of reactants, the reaction mass is recirculated externally through a conduit by means of a pump, or internally by means of impellers or the like. Other systems in use effect circulation by mechanically driven stirrers or by forced passage through transverse perforated plates.

In general, alkylation may be successfully carried out with due regard to a number of operating variables. These include isoparaffin-olefin ratio, which is determined primarily by relative concentrations of these components in the feed, and by the rate of recirculation within the reaction zone. Desirably, the ratio of isoparaffin to olefin in the feed has been found to be within the range of about 3:1 to 20:1, or higher, while the rate of recirculation is desirably such as to give an effective internal ratio of isoparaffin to olefin of about 100 to 1 or greater. Departure from optimum conditions will favor polymerization side reactions, etc.

Another operating variable of importance is strength of acid catalyst. The reaction can be satisfactorily carried out as long as the titratable acidity is within the range of about 85–98%. The strength of the make-up acid used ordinarily has between about 96 and 100 per cent acid, but the apparent strength in the reaction zone proper is lowered due to accumulation of acid-soluble hydrocarbons and complexes while the actual strength declines due to accumulation of water introduced with feed or in other ways. The higher acid concentrations are generally most desirable since lower concentrations tend to favor polymerization reactions at the expense of alkylation, and generally, for any given reactions and set of operating conditions, maintenance of a particular acid concentration is highly desirable. It has been found that maintenance of acid concentrations of 96–97% are highly favorable for alkylation of isobutane with butenes, while for alkylation of isobutane with propylene, an acid concentration of about 100% or a little higher is desirable in order to minimize formation of isopropyl sulfuric acid esters, although this reaction may be successfully carried out at lower acid concentrations.

The alkylation reaction is usually carried out at temperatures of 20–100° F., with the optimum range being between about 30 and 50° F. Reaction or contact time is of importance, and for the purpose of the present disclosure may be defined as the average time of passage of hydrocarbon phase through the acid phase, or the ratio of volume of acid in the chamber to the volume of hydrocarbon feed per unit time. This contact time runs from 5 to 90 minutes, usually 20–40 minutes time are allowed in many commercial installations. Pressures sufficient to maintain reactants in liquid phase are used, usually these pressures are about 45–65 pounds per sq. inch gauge.

During the reaction, the catalytic activity of the acid used decreases due to dilution with water and also due to dilution with reaction products which are presumably higher alkyl sulfuric acids. The latter diluent, however, does not affect the activity of the catalyst to the same degree as does dilution with water. Water is ordinarily introduced into the system either in the feed or by side reactions which occur with the incidental formation of water during the alkylation reaction.

Paraffin and olefin feeds may contain varying amounts of water up to saturation concentrations, and these concentrations may range under possible operating temperatures at from 0.01 to 0.50 mol per cent. It is ordinary practice to remove this water by dehydration prior to introduction into the reactor, but this involves the use of an additional dehydration step and furthermore, conventional dehydration methods are ineffective to remove all of the water, so that some will still be introduced into the system. As stated above, it is highly desirable to maintain a substantially constant acid concentration, and dilution with water will impair catalytic activity much more rapidly than the accumulation of soluble organic matter in the acid. If make-up acid is added to maintain acid concentration, the accumulation of substantial proportions of organic impurities in the acid may be permitted before it is necessary to remove spent acid from the system.

It is an object of the present invention to provide method and apparatus for eliminating the necessity for dehydrating feed, while at the same time supplying make-up acid to the systems and maintaining acidity of the sulfuric acid catalyst. More particularly, it is an object of the present invention to react the water contained in the feed with compounds which will produce as the reaction product thereof, additional sulfuric acid catalyst. It is a further object of the present invention to provide an excess of a material reactive with water to produce sulfuric acid catalyst sufficient to react with water in the feed as well as with water introduced by means of side reactions.

Applicant has found that in accordance with his invention, the necessity for dehydrating feed may be eliminated, and indeed becomes undesirable. At the same time he has discovered that by continuously removing water present in the feed, or elsewhere in the system, by reaction to form additional sulfuric acid, the actual acidity or water content of the catalyst may be maintained constant, so as to eliminate the tendency for hydrolytic side reactions and at the same time permit use of the catalyst for longer periods of time. The water content of the feed thereby serves to supply at least a portion of the make-up acid normally required.

In accordance with the present invention, advantage is taken of the fact that $SO_3$ will react with water in the presence of strong sulfuric acid to produce additional sulfuric acid, in accordance with the reaction

$$H_2O + SO_3 \rightarrow H_2SO_4$$

This reaction takes place readily in the presence of sulfuric acid of 90–100% concentration, but only to a slight extent in the absence of strong acid. In practicing the present invention, the water content of the olefin and isoparaffin components of the feed is determined, and an amount of $SO_3$ is introduced into the reaction zone stoichiometrically equivalent to the water so that on contact with the acid catalyst an amount of 100% sulfuric acid equivalent to the water content of the feed will be formed. Preferably the $SO_3$ is introduced in such a manner that intimate mixing of the water and $SO_3$ will occur in the presence of the acid catalyst, and for this reason it is desirable to introduce the $SO_3$ with the feed. In order to avoid any appreciable preliminary contact of $SO_3$ with the feed, particularly the olefin component thereof, it is also desirable to introduce the $SO_3$ into the feed as close to the point of entry into the catalyst zone as possible, or alternatively, to introduce $SO_3$ and feed simultaneously into the contact with acid at or near the same point. Where it is desired to compensate for water of reaction produced by side reactions within the zone, a slight excess of $SO_3$ may be added over that required to just react with the water in the feed. Another advantage of adding the $SO_3$ with the feed or very near to its point of introduction, is that since the feed contains water it is desirable to immediately remove the water in situ by reaction with $SO_3$, otherwise there will be a localized zone of higher water content in the reactor before intimate mixing can take place, and in this zone undesirable dilution of acid and consequent polymerization and other side reaction will occur.

In an alternative modification of the invention, the $SO_3$ may be added in the form of fuming sulfuric acid, which is prepared by dissolving $SO_3$ in $H_2SO_4$ in accordance with the reaction,

$$SO_3 + H_2SO_4 \rightarrow H_2S_2O_7$$

Stoichiometric amounts of $H_2S_2O_7$ added to the feed will react with water as follows:

$$H_2O + H_2S_2O_7 \rightarrow 2H_2SO_4$$

In order to avoid reaction of feed with the fuming acid the same precautions as to mode of addition should be observed.

Since the active reagent of the present invention is $SO_3$, either as such or dissolved in $H_2SO_4$ to form fuming sulfuric acid, as used herein $SO_3$ or sulfur trioxide refers to the compound $SO_3$ in gaseous state or in solution in $H_2SO_4$ as fuming sulfuric acid. It is apparent, therefore, that in accordance with the present invention, a predetermined acidity or water content of catalyst may be substantially maintained for a longer period of time than would normally be possible and with concomitant elimination of the necessity for dehydrating the feed. At the same time all or a portion of the make-up acid required is incorporated in this manner. By periodic or continuous removal of a portion of acid from the system and replacement by fresh make-up acid, organic impurities may be kept from building up, and the process may operate continuously for long periods of time, thus eliminating the necessity for reactivating or replenishing acid as frequently or to the extent required in present practice. Where catalyst of 100% acid or higher is used, this acidity may also be maintained by keeping water out of the system in the manner described.

The principles of the present invention may readily be applied utilizing the various operating conditions described above, subject only to the use of $SO_3$ in the manner described herein.

The invention may be further described in connection with the drawings, in which Fig. 1, illustrates diagrammatically a system of alkylation in which olefin and paraffin feeds are introduced separately along with separate introduction of the reagents of this invention. Fig. 2 describes an alkylation unit in which a mixed olefin-isoparaffin feed is introduced, with appropriate means for introducing the reagent described herein.

In accordance with Fig. 1, a water-containing isobutane feed, usually containing some n-butane, is introduced via line 1 and contacted with sulfuric acid of the desired concentration in mixer 2. $SO_3$ in an amount equivalent to the water content of the isobutane feed is introduced into line 1 via line 3, recycle or fresh acid or both being introduced into the mixer through line 4. In the mixer the water in the feed is converted to 100% acid by contact with the $SO_3$ in the presence of the acid catalyst, and this mixture of isobutane and acid is pumped into reactor 6 via line 5. Simultaneously a water-containing olefin feed is introduced through line 7 into the alkylator at a plurality of points through lines 8, 9, 10, 11 and 12. Multipoint introduction in this manner will permit maintenance of a desired high isoparaffin-olefin ratio. $SO_3$ in an amount sufficient to react with the water present in the olefin introduced at each point is admixed with olefin by means of line 13 and a plurality of branch lines 14, 15, 16, 17, 18, 19 and 20. In this manner contact of $SO_3$ with olefin takes place immediately prior to contact with acid catalyst to avoid side reactions prior to formation of sulfuric acid. The alkylate (or alkymer) produced, together with excess isobutane, unreacted n-butane and acid, is withdrawn through line 21 and introduced into acid settler 22 where the hydrocarbon phase separates to the top and the acid phase to the bottom. The hydrocarbon phase is pumped into deisobutanizing column 23 in which unreacted isoparaffin is separated and returned to the system via line 24. The bottom product which contains alkylate and any n-butane which may have been present in the feed, is removed from 23 by line 25 and introduced into column 26 wherein the n-butane is separated and removed overhead through line 27. The bottom product here, which is essentially composed of alkylate, is then introduced into column 29 through line 28, and material boiling above the desired motor fuel range is separated as a bottom product, the motor fuel product going overhead through line 30. Acid separated as a bottom layer in settler 22 is removed through line 31 and recycled to mixer 2. Make-up acid stored in vessel 32 is introduced as desired via line 33. Spent acid is removed from the system from the settler through line 34.

Figure 2 illustrates a modified form of the present invention without the recovery or recycling system being shown. An internal recycle type of contactor is shown at 50, sulfuric acid catalyst is introduced through line 51 while the paraffin-olefin feed in admixture in the proper proportions is introduced into the mixing zone 52 through conduit 53. An amount of $SO_3$ at least equivalent to the water content of the feed is continuously introduced into the mixing zone 52 through conduit 54. In the mixing zone rapid mixing and formation of $H_2SO_4$ occurs under the influence of agitator means 55 which draws the mixture of hydrocarbon and acid downwardly and forces it through the recirculation zone 56 up and out near the top of the chamber as shown by the arrows, so that a continuous recirculation takes place along with intimate mixing in zone 52.

The following examples are illustrative of the process.

*Example I*

A concentrated isobutane feed containing about 90% isobutane, the remainder substantially normal butane, and having a water content of about 0.08 pound per barrel is admixed with 96% sulfuric acid in the mixer. Just prior to entering the mixer a quantity of $SO_3$ is continuously admixed with the feed in the proportion of 0.36 pound of $SO_3$ per barrel of isobutane feed. This is just sufficient to react with the water contained in the feed. The acid-isobutane mixture is then introduced into the reactor at the top through a mixing jet. The flow rate is such as to give a total average residence time in the reactor of about 20 minutes, and the reaction temperature is maintained at about 75° F. The olefin feed, which consists essentially of a mixture of normal butenes and about 0.1 pound per barrel of water is introduced multipoint into the reactor through mixing jets at the five points of introduction. The rate of introduction is such as to give an isoparaffin-olefin mol ratio at each point of such introduction of about 100-1. At a point adjacent the entry of olefin into the reactor, gaseous $SO_3$ is added thereto in the proportion of about 0.45 pound per barrel of olefin feed introduced. The acid settled out is recycled at a rate which will give an acid-hydrocarbon ratio of about 2 to 1. Liquid phase conditions are maintained throughout. During alkylation the water-acid ratio is substantially maintained and the proportion of heavy alkylate and polymer formed is appreciably reduced. The overall life of the acid is increased and no dehydration of feed is required. The octane number of the motor fuel alkylate fraction will range from 90 to 92 by the C. F. R. motor method.

*Example II*

An isobutane-butene feed containing about 45% isobutane, 22% n-butenes and 25% n-butane, and the rest pentanes, is introduced into the apparatus of Figure 2. The feed contains about 0.06 mol per cent of water at 40° F., the temperature of introduction of the feed, which is kept in liquid phase under pressure. The feed is introduced at a rate which will permit a residence time of about 30 minutes, along with sulfuric acid catalyst of 95% acidity in the proportion of about 2 volumes of acid to one of feed. $SO_3$ gas is introduced into the mixing zone of the alkylator in the proportions equivalent to the mol concentration of the water in the feed so that the water content is reacted to produce sulfuric acid in the reaction zone. The internal recirculation is at a rate sufficient to maintain an effective ratio of isoparaffin to olefin of over 100 to 1. In this way dehydration of feed is avoided and water content and strength of acid is maintained for a substantial period of time. The gasoline fraction will have an ASTM octane rating of about 94.

Other hydrocarbons may be alkylated in lieu of isoparaffins, such as aromatics, and under certain conditions, normal paraffins, as is known to the art, and the present invention is applicable thereto for the purposes described herein. In cases where it is desired to continuously or periodically form more sulfuric acid in situ than would be formed by reactions of $SO_3$ with the water normally present in the feed, it may be desirable to incorporate additional water therein and react this water with $SO_3$ also to form the desired quantity of 100% sulfuric acid.

I claim:

1. In the production of alkylated hydrocarbons in which an alkylatable hydrocarbon feed is contacted with an alkylating agent in the presence of a concentrated sulfuric acid catalyst under alkylation conditions in an alkylation zone, and wherein the reactant materials contain water as an impurity therein, the process of performing said alkylation reaction without preliminarily removing said water from said reactants and maintaining the acid-water ratio of the catalyst at substantially its initial value, which comprises predetermining the water content of the reactants, continuously introducing into said reaction zone sufficient sulfur trioxide to react with all of the water introduced with said reactants to form sulfuric acid, said sulfur trioxide being introduced in a manner to substantially admix same with said water content of the reactants prior to intimate admixture with the sulfuric acid catalyst, contacting said reactants together with the introduced sulfur trioxide with said sulfuric acid in said alkylation zone under alkylating conditions and thereby forming additional sulfuric acid by reaction of the sulfur trioxide with the water to compensate for water introduced with the reactants and at the same time effecting alkylation of the hydrocarbon.

2. A process for alkylating a moisture-containing isoparaffin feed stock with a moisture-containing olefin feed stock in the presence of concentrated sulfuric acid as a catalyst in an alkylation zone, which comprises predetermining the moisture content of said feed stocks, continuously flowing said feed stocks into said alkylation zone in intimate contact with sulfuric acid catalyst of a desired concentration therein, continuously introducing into said feed stocks immediately prior to their introduction to said reaction zone a quantity of sulfur trioxide at least molecularly equivalent to the water contained in said feed stocks to cause reaction between said sulfur trioxide and said water in the presence of sulphuric acid to form additional sulfuric acid and thereby prevent dilution of the catalyst by water introduced with the feed and substantially maintaining the desired sulfuric acid concentration of the catalyst, and continuously contacting said isoparaffin and said olefin in the presence of the thus-formed sulfuric acid and the sulfuric acid catalyst initially present under alkylating conditions to form an alkylated hydrocarbon.

3. A process according to claim 2 in which the isoparaffin feed stock comprises isobutane and the olefin feed stock comprises a butene.

I. LOUIS WOLK.

REFERENCES CITED

The following references are of record in the file of this patent:

UNITED STATES PATENTS

| Number | Name | Date |
|---|---|---|
| 2,242,845 | Blount | May 20, 1941 |
| 2,361,600 | Carmody | Oct. 31, 1944 |
| 2,363,300 | Dunstan et al. | Nov. 21, 1944 |
| 2,363,301 | Dunstan et al. | Nov. 21, 1944 |

FOREIGN PATENTS

| Number | Country | Date |
|---|---|---|
| 540,824 | Great Britain | Oct. 31, 1941 |